United States Patent [19]

Vella et al.

[11] Patent Number: 4,839,152
[45] Date of Patent: Jun. 13, 1989

[54] PROCESS FOR PRODUCING AN AQUEOUS SOLUTION CONTAINING CHLORINE DIOXIDE AND CHLORINE

[75] Inventors: Philip A. Vella, Lenexa, Kans.; Manfred G. Noack, Northford, Conn.

[73] Assignee: Olin Corporation, Cheshire, Conn.

[21] Appl. No.: 173,476

[22] Filed: Mar. 25, 1988

[51] Int. Cl.$^4$ ............................................ C01B 11/02
[52] U.S. Cl. ................................................... 423/478
[58] Field of Search ........................................ 423/478

[56] References Cited

U.S. PATENT DOCUMENTS

| | | | |
|---|---|---|---|
| 2,344,346 | 3/1944 | Evans | 423/478 |
| 2,664,341 | 12/1953 | Kesting | 423/478 |
| 2,863,722 | 12/1958 | Rapson | 423/478 |
| 3,563,702 | 2/1971 | Partridge et al. | 423/478 |
| 3,733,395 | 5/1973 | Fuller | 423/478 |
| 3,789,108 | 1/1974 | Rapson | 423/478 |
| 3,816,077 | 6/1974 | Fuller et al. | 423/478 |
| 3,933,987 | 1/1976 | Schulz et al. | 423/478 |
| 3,974,266 | 8/1976 | Fuller | 423/478 |
| 3,975,505 | 8/1976 | Fuller | 423/478 |
| 4,013,761 | 3/1977 | Ward et al. | 423/477 |
| 4,045,542 | 8/1977 | Fuller | 423/478 |
| 4,049,784 | 9/1977 | Fuller | 423/478 |
| 4,049,785 | 9/1977 | Fuller | 423/478 |
| 4,079,123 | 3/1978 | Fuller et al. | 423/478 |
| 4,081,520 | 3/1978 | Swindells et al. | 423/478 |
| 4,137,296 | 1/1979 | Glew et al. | 423/478 |
| 4,143,115 | 3/1979 | Ward et al. | 422/113 |
| 4,156,713 | 5/1979 | Fuller | 423/478 |
| 4,247,531 | 1/1981 | Hicks | 423/477 |
| 4,250,144 | 2/1981 | Ratigan | 422/112 |
| 4,250,159 | 2/1981 | Cowley | 423/480 |
| 4,270,925 | 6/1981 | Isa et al. | 422/62 |
| 4,290,998 | 9/1981 | Dick et al. | 422/193 |
| 4,362,707 | 12/1982 | Hardee et al. | 423/478 |
| 4,381,290 | 4/1983 | Hardee et al. | 423/478 |
| 4,414,193 | 11/1983 | Fredette et al. | 423/478 |
| 4,426,263 | 1/1984 | Hardee et al. | 204/101 |
| 4,451,444 | 5/1984 | Santillie et al. | 423/480 |
| 4,473,540 | 9/1984 | Fredette | 423/479 |
| 4,501,824 | 2/1985 | Hardee et al. | 502/339 |
| 4,534,952 | 8/1985 | Rapson et al. | 423/478 |
| 4,578,261 | 3/1986 | Lobley | 423/478 |
| 4,618,479 | 10/1986 | Santillie et al. | 422/202 |
| 4,627,969 | 12/1986 | Fredette et al. | 423/478 |

OTHER PUBLICATIONS

U.S. patent application Ser. No. 07/173,520, filed on Mar. 25, 1988 to Kenneth E. Gasper and Philip A. Vella.

W. C. Lauer et al. "Experience with Chlorine Dioxide at Denver's Reuse Plant", *Journal AWWA*, Jun. 1986, pp. 79-87.

*Primary Examiner*—John Doll
*Assistant Examiner*—Jeffrey Edwin Russel
*Attorney, Agent, or Firm*—William A. Simons

[57] ABSTRACT

A process for the production of an aqueous solution containing chlorine dioxide and chlorine, which comprises:

(a) feeding to a reaction zone a first reactant stream comprising an aqueous solution containing an alkali metal chlorate and an alkali metal chloride;

(b) feeding to said reaction zone a second reaction stream comprising an acid admixture of phosphoric acid and sulfuric acid, wherein the weight ratio of said phosphoric acid to said sulfuric acid as expressed as $H_3PO_4:H_2SO_4$, is from about 1:16 to about 1:3;

(c) mixing said first and second reactant streams in said reactant zone; said streams being fed into said reaction zone at rates sufficient to form a reaction product stream comprising an aqueous solution of chlorine dioxide and chlorine in said reaction zone; and (d) withdrawing the resulting aqueous reaction product stream from said reaction zone.

18 Claims, 2 Drawing Sheets

PROCESS FOR PRODUCING AN AQUEOUS SOLUTION CONTAINING CHLORINE DIOXIDE AND CHLORINE

BACKGROUND OF THE INVENTION

1. Field of the Invention

The present invention relates to a process for producing an aqueous solution containing a mixture of chlorine dioxide and chlorine. In particular, the present invention relates to a process for producing an aqueous solution containing chlorine dioxide and chlorine wherein the chlorine dioxide and chlorine are produced by the reaction of an alkali metal chlorate, an alkali metal chloride and a mineral acid mixture consisting of selected ratios of phosphoric acid to sulfuric acid.

2. Brief Description of the Prior Art

Aqueous solutions containing a mixture of chlorine dioxide and chlorine have found use in bleaching pulp, water treatment applications and other end uses. Furthermore, the chlorine dioxide and chlorine values in the aqueous solution may be separated and used individually for these and other applications.

One known method for making such chlorine dioxide and chlorine-containing solutions commercially has been to react in an aqueous medium an alkali metal chlorate, an alkali metal chloride and a mineral acid together to form simultaneously both desired chemicals. This known reaction is illustrated by the following reaction equation (A), wherein the preferred alkali metal chlorate has been sodium chlorate, the preferred alkali metal chloride has been sodium chloride and the preferred mineral acid has been sulfuric acid:

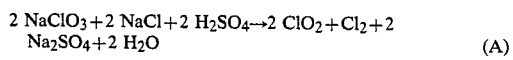

$$2\,NaClO_3 + 2\,NaCl + 2\,H_2SO_4 \rightarrow 2\,ClO_2 + Cl_2 + 2\,Na_2SO_4 + 2\,H_2O \quad (A)$$

As can be seen, two moles of chlorine dioxide are produced for each mold of chlorine produced by this reaction. Sodium sulfate is also produced as a byproduct. In commercial processes, this sulfate byproduct has been either immediately separated from the $ClO_2$ and $Cl_2$ products or kept in the same aqueous reaction mixture for later end use processing.

This reaction has been taught in U.S. Pat. Nos. 2,863,722 (Rapson); 3,563,702 (Partridge et al); 3,789,108 (Rapson); 3,816,077 (Fuller et al); 4,414,193 (Fredette et al); 4,534,952 (Rapson et al); and in many other U.S. Patents.

There are many known variations of this reaction. For instance, HCl may be used instead of the alkali metal chloride For example, see U.S. Pat. Nos. 2,344,346 (Evans) and 3,933,987 (Schulz et al). It is also known to employ methanol instead of the alkali metal chloride. For example, see U.S. Pat. No. 4,081,520 (Swindells et al). It is also known to additionally use a bisulfate as a reactant. For example, see U.S. Pat. No. 3,733,395 (Fuller). It is also known to make $ClO_2$ alone by reacting a chlorate with a mineral acid in the presence of a catalyst. For example, see U.S. Pat. No. 4,362,707 (Hardee et al). All of the above-noted U.S. Patents are incorporated herein by reference in their entireties.

While these above noted U.S. Patents generally teach that sulfuric acid is the preferred mineral acid reactant, some references also state that hydrochloric acid or phosphoric acid may instead be used. But, in fact, only U.S. Pat. Nos. 4,362,707; 4,381,290; 4,426,263; and 4,501,824 provide actual experimental data where $H_3PO_4$ was used as a mineral acid instead of $H_2SO_4$ in this type of reaction. See Example 8 of those four patents.

Moreover, some of these references make broad statements that mixtures of sulfuric acid and phosphoric acid may be employed as the mineral acid reactant for this particular reaction. For example, see column 5, lines 30–33; column 6, lines 69–71 and claim 1 of U.S. Pat. No. 3,563,702 (Partridge et al); claims 1 and 5 of U.S. Pat. No. 3,816,077 (Fuller et al); and column 3, lines 1–3 of U.S. Pat. No. 4,534,952 (Rapson et al). But, in fact, no teaching has been found where a mixture of sulfuric acid and phosphoric acid was ever actually used for this type of reaction.

One problem reported with the reaction of Equation (A), above, and similar reactions, is chlorine dioxide "puffing" or spontaneous autodecomposition in the reaction vessel. While the reason why this unwanted decomposition occurs is not exactly known, it is believed to be tied to the reaction temperature and presence of impurities or formed byproducts in the reaction mixture. This "puffing" is undesired because it causes a decrease in the yield of the $ClO_2$ product and, if great enough, explosions which may damage equipment or shut down processes or both. Also, it has been found that once this $ClO_2$ "puffing" begins, it may continue to proceed unless the reaction conditions in the reaction vessel are changed.

Accordingly, there is a need in the art for producing an aqueous mixture of $ClO_2$ and $Cl_2$ by reacting an alkali metal chlorate, alkali metal chloride and a mineral acid together wherein there is a reduced likelihood of chlorine dioxide "puffing". The present invention does present a solution to that need.

BRIEF SUMMARY OF THE INVENTION

Accordingly, the present invention is directed to a process for the production of an aqueous solution containing chlorine dioxide and chlorine, which comprises:

(a) feeding to a reaction zone a first reactant stream comprising an aqueous solution containing an alkali metal chlorate and an alkali metal chloride;

(b) feeding to said reaction zone a second reaction stream comprising an acid admixture of phosphoric acid and sulfuric acid, wherein the weight ratio of said phosphoric acid to said sulfuric acid, as expressed as $H_3PO_4:H_2SO_4$, is from about 1:16 to about 1:3;

(c) mixing said first and second reactant streams in said reaction zone; said streams being fed into said reaction zone at rates sufficient to form a reaction product stream comprising an aqueous solution of chlorine dioxide and chlorine in said reaction zone; and (d) withdrawing the resulting aqueous reaction product stream from said reaction zone.

DETAILED DESCRIPTION

A description of the present invention will be explained through the preferred embodiment shown in FIGS. 1 and 2. Of course, other preferred embodiments of this invention are encompassed within the broad scope of the present claimed invention.

Figure 1:
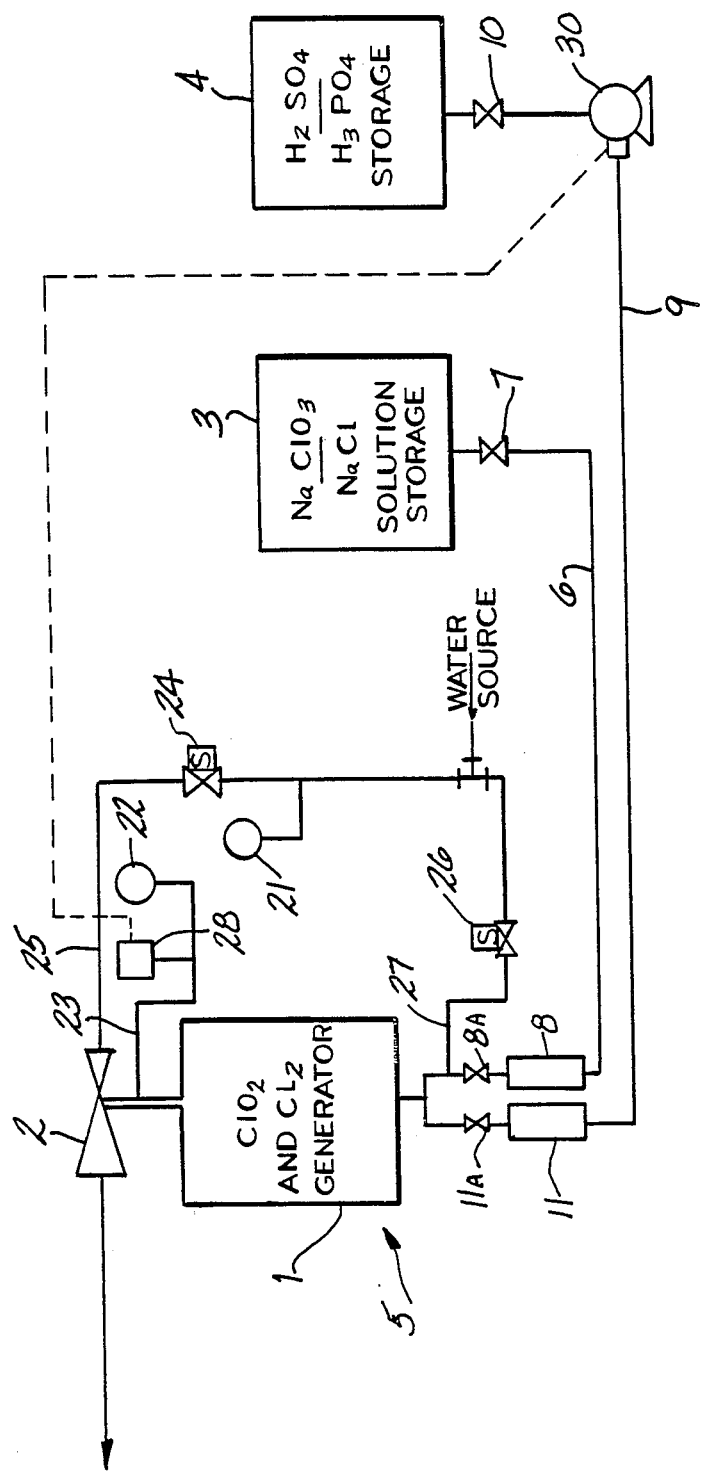
FIG. 1 illustrates schematically one embodiment of the present process for producing an aqueous solution containing chlorine dioxide and chlorine.
Figure 2:
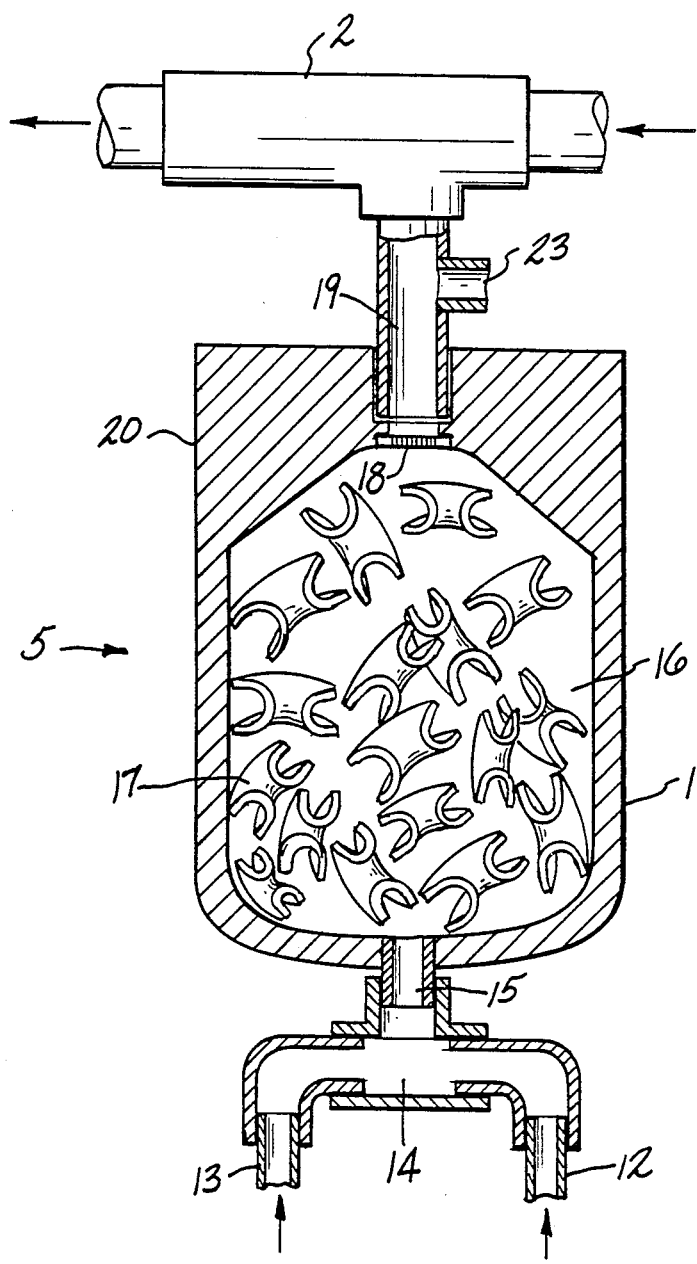
FIG. 2 illustrates a detailed cross-sectional view of the reaction zone and water eductor shown in FIG. 1.

Referring to FIGS. 1 and 2, an aqueous sodium chlorate/sodium chloride solution is reacted with an admixture of phosphoric acid and sulfuric acid to form chlorine dioxide and chlorine gas in a chlorine dioxide and chlorine generation vessel 1. This reaction mixture is vacuum educted from this generation vessel 1 by means of a motive water stream flowing through eductor 2. The resultant aqueous solution contains sufficient amounts of chlorine dioxide and chlorine to be useful for many end uses such as waste and industrial water treatment and the like.

The sodium chlorate/sodium chloride reactant solution preferably contains from about 16.5% by weight (about 2.07 Molar) to about 35% by weight (about 4.39 Molar) sodium chlorate and about 5% by weight (about 1.14 Molar) to about 25% by weight (about 5.69 Molar) sodium chloride. More preferably, the amounts of sodium chlorate and sodium chloride in this aqueous solution are from about 20–30% by weight (about 2.51 to about 3.76 Molar) and 10–20% by weight (about 2.28 to about 4.55 Molar), respectively. The most preferable amounts of these two reactants in this aqueous solution is from about 22.5–27.5% by weight (about 2.82 to 3.45 Molar) and about 12.5–17.5% by weight (about 2.85 to 3.99 Molar), respectively. Preferably, within these relative amounts, the molar ratio of sodium chlorate to 1.0:1.15; more preferably, from about 1.0:1.03 to about 1.0:1.10.

This sodium chlorate/sodium chloride reactant solution may be obtained from chlorine/caustic manufacturing plants as a byproduct. Alternatively, other alkali metal chlorates and chlorides (e.g. potassium) may be employed instead of the above-mentioned sodium salts. Another embodiment of the present invention is separately add an aqueous chlorate solution and an aqueous chloride solution in the resultant weight amounts and ratios mentioned above, to the reaction zone.

The phosphoric acid/sulfuric acid reactant admixture may be made from any concentrated phosphoric acid and concentrated sulfuric acid sources. A suitable concentrated phosphoric acid solution which is commercially available is 75% by weight $H_3PO_4$. A suitable concentrated sulfuric acid solution which is commercially available is 96% by weight $H_2SO_4$ (66° Be'). It is generally desirable to premix these two acids at a location other than where the present $ClO_2$ and $Cl_2$ generating apparatus is located for safety considerations and to better control any of the heat generated by the mixing operation. However, an alternative embodiment of the present invention is to mix the two acids just prior to the reaction zone, but within the weight ratios required.

A critical feature of the present invention, as stated above, is that active weight to weight ratio of the two acids must be in the range from 1:16 to 1:3 by weight of phosphoric acid (expressed as $H_3PO_4$) to sulfuric acid (expressed as $H_2SO_4$) Preferably, this weight ratio is from about 1:15 to about 1:10 by weight. Most preferably, this ratio is from about 1:14 to about 1:11 by weight.

At the site of the present generator apparatus, the sodium chlorate/sodium chloride reactant solution is stored in a storage container 3 and the phosphoric acid/sulfuric acid solution is stored in storage container 4. These storage containers may be made of any suitable non-reactive material such as polyethylene or fiberglass. They should be of sufficient size to minimize the number of refills. It may also be desirable in some instances to provide agitation means and means to protect the reactants against freezing in these storage containers 3 and 4.

The aqueous sodium chlorate/sodium chloride reactant solution is transferred to the reaction zone 5 through chemical transfer or feed line 6 past manual shut-off valve 7 and flow rate indicator/controller or rotometer 8 and check valve 8A. An optional pumping means (not shown) may be employed in transfer or feed line 6 to aid in the transfer of the chlorate/chloride mixture through the reaction zone. However, the vacuum created by eductor 2 is normally by itself sufficient to cause this chlorate/chloride solution to feed into generation vessel 1. The acid mixture is also transferred to the reaction zone 5 through chemical transfer or feed line 9 past manual shut-off valve 10, pumping means 30, and flow rate indicator/controller or rotometer 11 and check valve 11A. Pumping means 30 is preferably employed in transfer or feed line 9 to aid in the transfer of the acid mixture through the reaction zone because the density and viscosity of the acid mixture, as compared to the chlorate/chloride solution, is much heavier and more viscous so that the vacuum created by eductor 2 may not be by itself sufficient to cause the acid mixture to be fed into generation vessel 1. However, in some instances, it may be desirable to use gravity flow or other liquid transfer techniques in transfer or feed line 9 instead of pumping means 30. Preferred manual shutoff valves 7 and 10 provide the operator with means for overriding the automatic controls of the preferred system or with means for stopping reactant flow when the reactant vessel is periodically disassembled and cleaned.

The ratio of feed for each of these two reactant streams is preferably adjusted by rotometers 8 and 11 to provide maximum yield of chlorine dioxide from the reaction zone based on the amount of sodium chlorate added. This adjustment is done because the $ClO_2$ is usually a more valuable product than $Cl_2$ and sodium chlorate is usually the most expensive reactant. Accordingly, it is desired that substantially all of the chlorate (i.e. at least about 90% by weight) be converted. The preferred volume ratio of the feed rates of the two reactant streams is approximately 0.65 to 1.0 parts by volume of the phosphoric acid/sulfuric acid stream per 1 part by volume of sodium chlorate/sodium chloride solution.

The mixing of the aqueous chlorate/chloride solution with the acid solution causes an evolution of heat. Thus, this temperature of the reaction mixture in generation vessel 1 will generally be at its boiling point (about 60° C. to 70° C.) under the vacuum conditions created by the motive water stream flowing through eductor 2.

The two reactant streams are each drawn into the reaction zone 5 by the vacuum created by the motive water stream through eductor 2. FIG. 2 illustrates reaction zone 5 and eductor 2 in detail. The sodium chlorate/sodium chloride solution enters reaction zone 5 through feed conduit 12 and the phosphoric acid/sulfuric acid admixture enters reaction zone through feed conduit 13. The two reactant solutions mix together in mixing zone 14 and, together, are drawn up through mixing conduit 15 into reaction chamber 16 which is preferably filled with packing material 17 (e.g. one inch ceramic saddles) to insure thorough mixing and reaction of the reactant chemicals. As the reactants pass upward through the packing 17, chlorine dioxide and chlorine gas are both formed in the liquid reaction mixture. It should be noted that the completion of the forming $ClO_2$ and $Cl_2$ reaction does not occur in the mixing zone 14, but in the reaction chamber 16. The eductor vacuum continues to draw this gas-laden liquid reaction mixture upward through screen 18 (which prevents the packing material from also being drawn upward) and exit conduit 19 into eductor 2, where the reaction mixture is dissolved into the motive water stream and thus form a useful aqueous effluent solution.

The walls 20 of generator vessel 1 as well as conduits 12, 13, 15 and 19 and packing material 17 and screen 18 should all be made up of non-reactive materials such as high temperature-resistant plastics. Preferred plastic materials include polyvinylidene fluoride (PVDF) and fluorine-containing resins such as polytetrafluoroethylene (TEFLON).

The interior wall geometry and size of generator vessel 1 are preferably designed to enhance the performance of the acid mixture reactant as used in the process of the present invention. Reaction chamber 16 is preferably a cylinder having no corners or void spaces where reaction mixing may be minimized or $ClO_2$ and $Cl_2$ gases could be trapped or accumulated (and thus where such trapped quantities of $ClO_2$ could autodecompose or "puff"). As shown in FIG. 2, reaction chamber 16, when cylindrical, preferably has a lower or bottom portion which is rounded upward or concave, said concave portion constituting (i.e. about 1/16 to about ¼ of the internal height) into vertical cylindrical walls. An upper portion (i.e. about ⅛ to ⅓ of the internal height) of the reaction chamber 16 is preferably conical in shape up to the exit conduit 19. The packing material 17 provides better reactant mixing and further lessens the probability of any relatively large $ClO_2$ or $Cl_2$ gas bubbles from evolving from the reaction zone 5.

The configuration of the reaction chamber 16 preferably is such that the ratio of the height (i.e. measured from the top of mixing conduit 15 to screen 18) to the diameter (i.e. widest possible diameter) is from about 1:0.3 to about 1:1.75; more preferably, about 1:0.5 to about 1:1). The usable chamber volume (i.e. chamber volume after packing) is preferably from about 100 to 2000 milliliters, more preferably, from about 400 to 600 milliliters. The relatively small reaction chamber 16, as compared to the long slender columns of the prior art is sized to afford sufficient volume to substantially complete the reaction in the reaction vessel 16, but the residence time of the formed gases is minimized to further prevent or reduce autocomposition of formed $ClO_2$ gas.

The motive water stream in eductor 2 is supplied under pressure, preferably from about 40 to about 95 psig (more preferably from about 60 to about 80 psig). This water pressure may be measured by means of pressure gauge 21 shown in FIG. 1. The movement of this pressurized water stream through the venturi construction of the eductor 2 creates a vacuum in reaction zone 5. This vacuum is preferably from about 550 mm Hg to about 760 mm Hg, more preferably from about 600 to 730 mm Hg. The vacuum may be measured by vacuum gauge 22 which is connected to exit conduit 19 by means of vacuum measuring conduit 23.

The aqueous reaction mixture containing the formed $ClO_2$ and $Cl_2$ after leaving the reaction chamber 16 is dissolved in the motive water stream. Thus, the effluent water stream after the eductor 2 may contain about 100 to about 2500 mg/L or more of $ClO_2$ and about 50 to about 1250 mg/L of $Cl_2$, depending on the generation rate desired. The effluent $ClO_2$ strength may be kept below 2500 mg/L by using a larger eductor which uses a higher motive water flow. This may be desirable to lessen the probability of $ClO_2$ autodecomposition later in the effluent stream.

This preferred process may be easily operated with an automatic electrical control system (not shown). This control system may cause the process to work by opening water inlet solenoid valve 24 and thus allowing the motive water stream to pass through water feed line 25 to eductor 2. In turn, this creates the vacuum which draws the reactant solutions through 8 and 11 and generator vessel 1. Where pump 30 is present, it is simultaneously turned on when inlet solenoid valve 24 is opened. At the end of the predetermined generation cycle or time period, the control system closes inlet solenoid valve 24 and shuts off pump 30 and opens purge water solenoid valve 26 for a predetermined period of time so that water enters generation vessel 1 through purge water line 27 to purge generator vessel 1 and the effluent line. Check valves 8A and 11A prevent the flow of purge water back into feed lines 6 and 9.

Moreover, this control system may be used to shut down this $ClO_2$ and $Cl_2$ generation system if in the unlikely event that an unwanted $ClO_2$ puff occurs. Since $ClO_2$ autodecomposition or puffing causes a drop or decrease in the vacuum in the generator vessel 1, this vacuum decrease is monitored by a vacuum sensing means and switch 28 connected to vacuum conduit 23. The preferred sensing means/switch 28 is one manufactured by Static-O-Ring Inc. of Olathe, Kans. (Model 54PP-K118MX-J2A). Upon the registering of vacuum decrease, the vacuum sensing means and switch 28 will send an electronic signal which will immediately stop pump 30 for a sufficient period of time (e.g. at least about 30 seconds, more preferably about 1-5 minutes) for the generator vessel to purge itself of all chlorine dioxide content. For example, under normal most preferred conditions the vacuum in the generation vessel 1 is run under a vacuum of about 600 to 730 mm Hg. When $ClO_2$ autodecomposition occurs (i.e. a puffing event), the vacuum usually immediately decreases to below 500 mm Hg. Thus, setting the vacuum sensing means 28 to send an electrical output signal to pump 30 when the vacuum goes to 500 mm Hg or below will result in an immediate stopping of the reaction in the reaction chamber 16. During this predetermined time period after a detection of a puff, the reaction chamber 16 is fed only the chlorate/chloride solution and no acid reactant. Thus, this stops any further reaction and prevents the continuation of undesired puffing. After this predetermined time period for process adjustment, the pump 30 is started up again to allow acid flow. A solenoid valve may be used instead of pump 30 where such pumping means are not needed to aid the feeding of the acid mixture into the generation vessel 1.

Another preferred embodiment of this invention encompasses the introduction of a chemical reactant into either exit conduit 19, water stream 25, eductor 2 or the effluent stream which selectively reacts with and removes the $Cl_2$ in the reaction mixture or effluent stream and thus leaves an aqueous solution of $ClO_2$ substantially free of $Cl_2$. Such aqueous solutions of substantially pure $ClO_2$ have particular use in treating potable water streams. One chemical reactant which reacts much faster with $Cl_2$ than $ClO_2$ and, thus, may be useful herein is hydrogen peroxide.

Advantages of these preferred process embodiments of the present invention include the following:

1. The overall size of the generator (excluding the reactant storage tanks) is relatively small. For example, it may be mounted on a free-standing support backing wall having an area of six feet by six feet or less. Furthermore, the overall weight of the generator is relatively light. The weight of the support and the generator (again excluding the reactant storage tanks) may be less than 250 pounds. Together these relatively small size and weight characteristics make this apparatus easily transferable or usable in crowded spaces.

2. There is no need for external heating or cooling means to the generator vessel. Thus, energy costs are minimized and no additional heating or cooling equipment is needed as required in prior art processes.

3. All of the spent reactants are discharged through the eductor. There is no buildup of any reactants or byproducts in the generator vessel. Therefore, the generator vessel does not have to be frequently shut down and cleaned.

4. The combination of phosphoric acid and sulfuric acid in the above-noted weight ratios significantly reduces the possibility of unwanted "puffing" or the spontaneous autodecomposition of chlorine dioxide. Further, the internal geometry and size of the generation vessel further reduces the possibility of this unwanted "puffing". Thus, high stoichiometric yields of $ClO_2$ may be achieved on a continuous basis Moreover, even if the puffing event should occur, the design of the preferred generating apparatus allows for the immediate stoppage of puffing and return to the desired generation mode. All of these features increase the safety and reliability of the whole system. Thus, this generator may be run in out-of-the-way places without having an operator continuously monitoring its operation.

5. The $ClO_2$ and $Cl_2$ generation rates may be easily varied over a wide range.

6. Inexpensive materials of construction may be used for constructing the generator compared to titanium material employed on prior art systems.

7. Because of the relatively small size of the generator, the reaction time is relatively fast (e.g. less than 2 minutes). Moreover, the process may be quickly started up and shut down. This gives the operator good control over the process being treated.

8. The process of this invention enables using $NaClO_3$ for small scale production of $ClO_2$. Heretofore there were no chlorate-based processes which lent themselves to small-scale production of $ClO_2$.

The following Examples and Experiments are provided to better illustrate the present invention. All parts and percentages are by weight unless explicitly stated otherwise.

EXAMPLES A–D

A chlorine dioxide and chlorine generation system as shown in FIGS. 1 and 2 was experimentally employed to control microbiological organisms in an industrial cooling tower. The aqueous sodium chlorate/sodium chloride reaction solution contained 25.5% by weight sodium chlorate and 14.9% by weight sodium chloride. The mixed acid reactant solution contained 7.14% by weight $H_3PO_4$ [supplied by concentrated solution of phosphoric acid (75% strength)] and 86.86% by weight $H_2SO_4$ [supplied from 96% concentrated sulfuric acid (66° Be′)]. In Table 1, four different runs with different reactant feed rates are shown. The motive water pressure was measured by pressure gauge 21 and water flow rate water feed line 25 as shown in the FIGURES. The amounts listed were the vacuum in the generator as measured on vacuum gauge 22. The theoretical dioxide amount is based on 100% conversion of sodium chlorate into $ClO_2$ by reaction equation (A) above. The actual chlorine dioxide amounts were those amounts measured by means of a Hach Spectrophotometer Model DR/3000 employing Procedure Codes C.5 or C.6. $Cl_2$ was not measured in these Examples.

TABLE I

| Chlorate Feed cc/Min. | Volume Ratio Chlorate to Acid | Acid Feed cc/Min. | Motive Water Pressure psi | Motive Water Flow Rate gpm | Vacuum mm Hg | $ClO_2$ Theoretical mg/L | $ClO_2$ Actual mg/L | % Actual % Theoretical |
|---|---|---|---|---|---|---|---|---|
| 33.32 | 1:0.90 | 30.00 | 75 | 9.9 | 715 | 202 | 194 | 96 |
| 75.00 | 1:0.80 | 60.00 | 65 | 9.8 | 695 | 460 | 445 | 97 |
| 135.00 | 1:0.66 | 90.00 | 65 | 9.8 | 695 | 827 | 790 | 96 |
| 265.00 | 1:0.66 | 175.00 | 65 | 9.8 | 693 | 1623 | 1550 | 96 |

EXPERIMENTS 1–11

Various admixtures of concentrated phosphoric acid ① and concentrated sulfuric acid ② (See Table II for each particular weight/weight ratio of these acids) were combined with an aqueous solution containing 3.2 molar sodium chlorate and 3.4 molar sodium chloride in an apparatus similar to that shown in FIGS. 1 and 2. The temperature of each reactant solution before mixing was room temperature (25° C.).

The concentrated phosphoric acid solution used was 75% by weight strength $H_3PO_4$. The concentrated sulfuric acid used was 96% concentrated $H_2SO_4$ (66° Be′).

The feed ratio for these reactant solutions are given in Table II for each experiment. As can be seen from Table II, the feed rates differed for each experiment. These differences were to determine generator output over different operating conditions. It should also be noted that a large excess of acid was used for each of these experiments. An acid excess will accelerate the likelihood of puffing. Thus, in these experiments, an attempt toward puffing was induced. The mixing of the acid mixture with the aqueous solution of chlorate/chloride produced an exotherm and the temperature of each combined reaction mixture rose to about 60°–70° C. as measured by a thermocouple attached to the mixing zone below the packed $ClO_2$ and $Cl_2$ generation vessel. The combined reaction mixture was pulled upward through the saddle packing of the generation vessel by means of a vacuum created by a water eductor stream concurrently running at the top of the generation vessel. The amount of eductor water for each experiment was six gallons per minute. The vacuum created by the eductor stream was from about 700 to about 500 mm Hg for each experiment and was measured by means of a vacuum gauge as shown in FIG. 1.

Besides the $H_3PO_4/H_2SO_4$ weight ratio and the feed rates for the two reactant streams, Table II below shows the Time to Decomposition (in seconds) and Average Percentage Yield. Time to Decomposition is the time from the start of the mixing of the reactants until an unwanted "puffing" event was observed. Such events were shown by a drop or loss in the vacuum in the generator vessel as seen on the vacuum gauge. The longer the time before decomposition, the more suitable the reaction mixture would be in a commercial process. The average percentage yield is based on the amount of sodium chlorate reactant employed. One mole of sodium chlorate should theoretically produce one mole of chlorine dioxide and one-half mole of chlorine. When looking at yields alone, the higher the yields, the more commercially desirable the acid admixture reactant would be.

The amount of chlorine dioxide (in ppm) was measured in the eductor water stream by means of a Hach Spectrophotometer Model DR/3000 employing either Procedure Codes C.5 or C.6. The ppm of $Cl_2$ were determined from the educted water stream by the amperometric titration technique described by Aieta et al, J.A.W.W.A., January 1984, p. 64.

The yields of $ClO_2$ and $Cl_2$ were then calculated from these measured ppm values and the amount of sodium chlorate reactant.

TABLE II

Effects of Different $H_3PO_4:H_2SO_4$ Ratios on $ClO_2$ Decomposition and $ClO_2$ and $Cl_2$ Yields

| Experiment | $H_3PO_4:H_2SO_4$ Weight/Weight Ratio | Acid Mixture Feed Rate (ml/min) | Chlorate/Chloride Stream Feed Rate (ml/min) | Time to Decomposition (Sec) | $ClO_2$ ppm | $ClO_2$ % | $Cl_2$ ppm | $Cl_2$ % |
|---|---|---|---|---|---|---|---|---|
| 1 | 0:1 | 192 | 76 | 30 | 644 | 92–95% | N.M.④ | N.M. |
| 2 | 1:60 | 192 | 76 | 30 | N.M. | N.M. | N.M. | N.M. |
| 3 | 1:30 | 192 | 76 | 45 | N.M. | N.M. | N.M. | N.M. |
| 4 | 1:15 | 90 | 40 | >240 | 299 | 93–96% | N.M. | N.M. |
| 5 | 1:7.5 | 112 | 52 | >240 | 416 | 84% | N.M. | N.M. |
| 6 | 1:3 | 128 | 48 | >300 | 384 | 84% | N.M. | N.M. |
| 7 | 1:0 | 225 | 48 | N.D.③ | <50 | <10% | N.M. | N.M. |
| 8 | 1:13.50 | 21 | 18 | >240 | 86 | 71% | 34 | 53 |
| 9 | 1:13.50 | 45 | 23 | >240 | 114 | 81% | 54 | 80 |
| 10 | 1:13.50 | 45 | 45 | >240 | 212 | 83% | 101 | 76 |
| 11 | 1:13.50 | 37 | 41 | >240 | 244 | 100% | 120 | 96 |

③N.D. = Not Determinable. This experiment did not show any evidence of $ClO_2$ decomposition, however, this may be due to the fact that almost no $ClO_2$ was formed.
④N.M. = Not Measured. The yield of $ClO_2$ or $Cl_2$ were not measured for these experiments.

The times to decomposition >240 and >300 in Table II mean that no decomposition occurred during the time period of these experiments. The data in Table II indicates that increasing the phosphoric acid to sulfuric acid ratio reduces the probability of $ClO_2$ decomposition. The data also indicates range of $H_3PO_4:H_2SO_4$ (weight to weight) ratios which provide superior yields with lower probability of $ClO_2$ decomposition is from about 1:16 to about 1:3 (weight to weight). The data also shows that about 1:15 to about a 1:10 (weight to weight) $H_3PO_4:H_2SO_4$ ratio provides the more optimum characteristics.

What is claimed is:

1. A process for the production of an aqueous solution containing chlorine dioxide and chlorine, which comprises:
   (a) feeding to a reaction zone a first reactant stream comprising an aqueous solution containing an alkali metal chlorate and an alkali metal chloride;
   (b) feeding to said reaction zone a second reaction stream comprising an acid admixture of phosphoric acid and sulfuric acid, wherein the weight ratio of said phosphoric acid to said sulfuric acid, as expressed as $H_3PO_4:H_2SO_4$, is from about 1:16 to about 1:3;
   (c) mixing said first and second reactant streams in said reaction zone; said streams being fed into said reaction zone at rates sufficient to form a reaction product stream comprising an aqueous solution of chlorine dioxide and chlorine in said reaction zone; and
   (d) withdrawing the resulting aqueous reaction product stream from said reaction zone.

2. The process of claim 1 wherein said alkali metal chlorate is sodium chlorate and said alkali metal chloride is sodium chloride.

3. The process of claim 2 wherein said sodium chlorate is present in an amount from about 16.5% to about 35% by weight of said aqueous first reactant stream.

4. The process of claim 3 wherein said sodium chloride is present in an amount from about 5% to about 25% by weight of said first reactant stream.

5. The process of claim 4 wherein said molar ratio of said sodium chlorate to said sodium chloride in said first reactant stream is from about 1:0.9 to about 1:1.15.

6. The process of claim 1 wherein said weight ratio of said phosphoric acid to said sulfuric acid is, as expressed as $H_3PO_4:H_2SO_4$, from about 1:15 to about 1:10 in said second reactant stream.

7. The process of claim 6 wherein said weight ratio is from about 1:14 to about 1:11.

8. The process of claim 1 wherein the volume ratio of said second reactant stream to said first reactant stream as fed into said reaction zone is about 0.65:1.0 to about 1.0:1.0.

9. The process of claim 1 wherein said resulting reaction product stream is withdrawn from said reaction zone by means of a water eductor.

10. A process for the production of an aqueous solution containing chlorine dioxide and chlorine, which comprises:
   (a) feeding to a reaction zone a first reactant stream comprising an aqueous solution containing sodium chlorate and sodium chloride herein said sodium chlorate is present in an amount from about 16.5% to about 35% by weight of said aqueous first reactant stream and wherein said sodium chloride is present in an amount from about 5% to about 25% by weight of said first reactant stream;
   (b) feeding to a reaction zone a second reaction stream comprising an acid admixture of phosphoric acid and sulfuric acid, wherein the weight ratio of said phosphoric acid to said sulfuric acid, as expressed as $H_3PO_4:H_2SO_4$, is from about 1:15 to about 1:10;

(c) mixing said first and second reactant streams in said reaction zone, said streams being fed into said reaction zone at rates sufficient to convert substantially all of said sodium chlorate and to form an aqueous reaction product stream comprising an aqueous solution of chlorine dioxide and chlorine in said reaction zone, wherein the volume ratio of said second reactant stream to said first reactant stream as fed into said reaction zone is from about 0.65:1.0 to about 1.0:1.0; and (d) withdrawing the resulting aqueous reaction product stream is withdrawn from the reaction zone and diluted with motive water passing through an eductor.

11. The process of claim 10 wherein said sodium chlorate is present from about 20% to about 30% by weight of the first reactant stream.

12. The process of claim 11 wherein said sodium chlorate is present from about 22.5% to about 27.5% by weight of said first reactant stream.

13. The process of claim 10 wherein said sodium chloride is present from about 10% to about 20% by weight of said first reactant stream.

14. The process of claim 13 wherein said sodium chloride is present from about 12.5% to about 17.5% by weight of said first reactant stream.

15. The process of claim 10 wherein said molar ratio of said sodium chlorate to said sodium chloride in said first reactant stream is from about 1:0.9 to about 1:1.15.

16. The process of claim 15 wherein said molar ratio of said sodium chlorate to said sodium chloride in said first reactant stream is from about 1:1.03 to about 1:1.10.

17. The process of claim 10 wherein said weight ratio of said phosphoric acid to said sulfuric acid is, as expressed as $H_3PO_4:H_2SO$, from about 1:14 to about 1:11 in said second reactant stream.

18. The process of claim 10 wherein the diluted water stream leaving the eductor contains about 100 to about 2500 mg/L of $ClO_2$ and about 50 to about 1250 mg/L of $Cl_2$.

* * * * *